July 27, 1943.  H. E. TAUTZ  2,325,083
STAND FOR MOTOR DRIVEN TOOLS AND THE LIKE
Filed Feb. 3, 1941  5 Sheets-Sheet 3.

Inventor
Herbert E. Tautz
By Carl A. Hellmann
Attorney

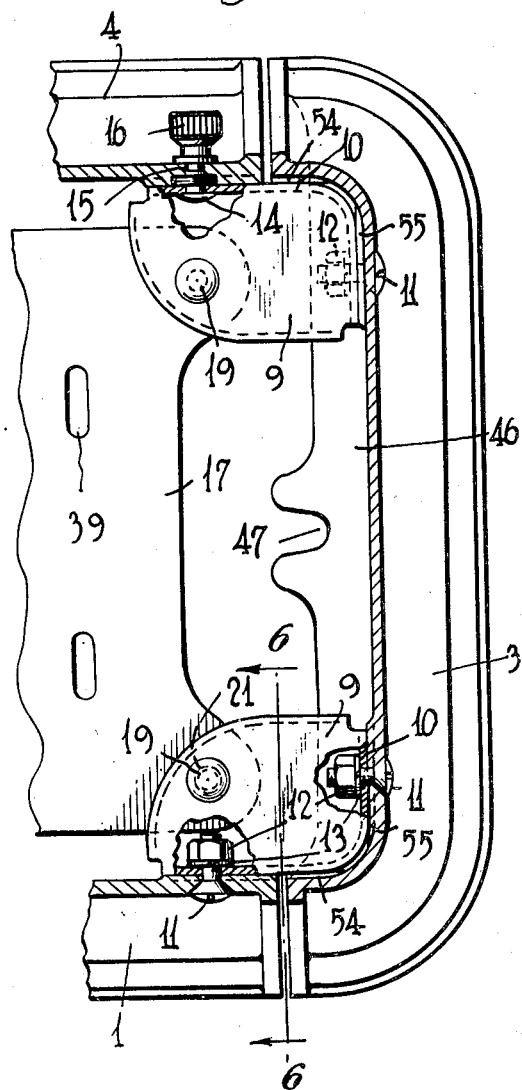
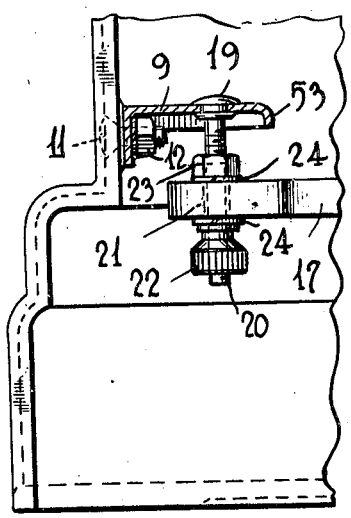

July 27, 1943.  H. E. TAUTZ  2,325,083
STAND FOR MOTOR DRIVEN TOOLS AND THE LIKE
Filed Feb. 3, 1941  5 Sheets-Sheet 5
Fig. 7
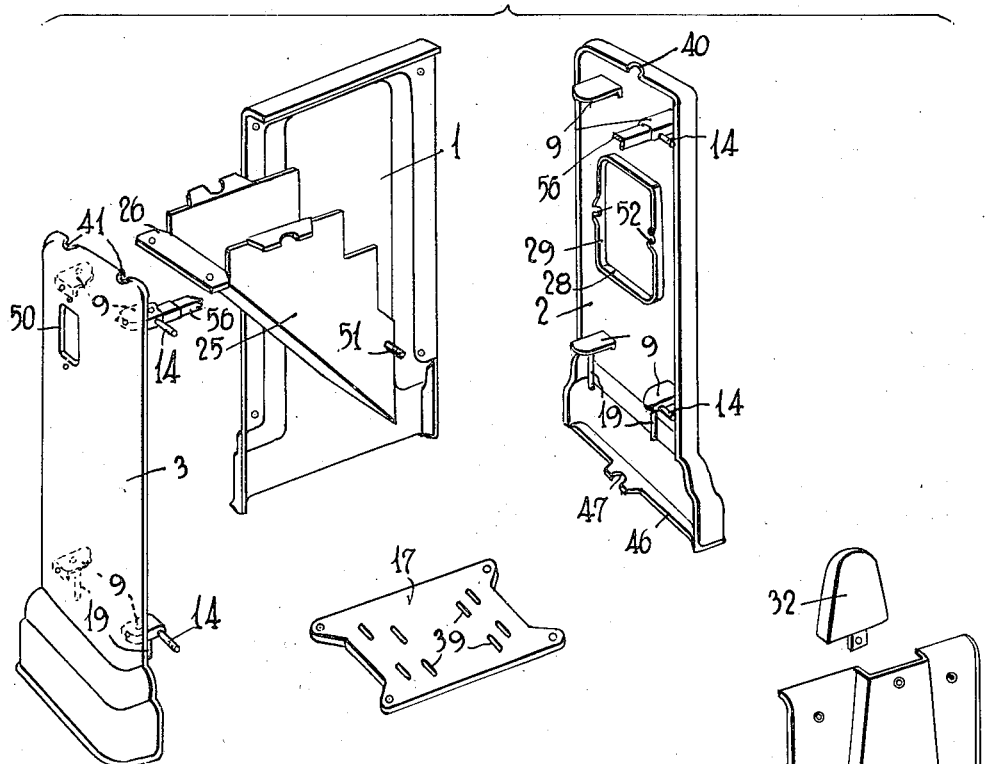
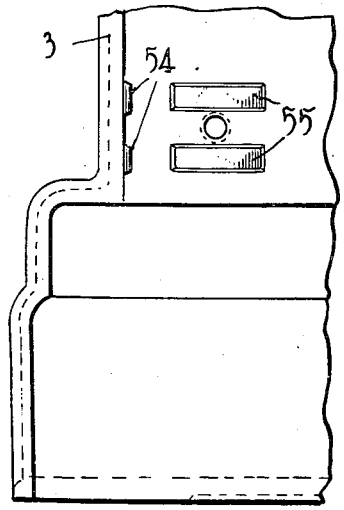
Fig. 8
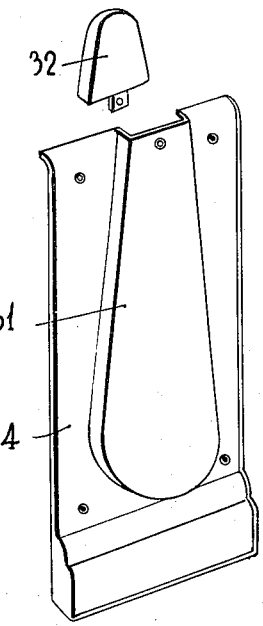
Inventor
Herbert E. Tautz
By Carl A. Hellmann
Attorney Patented July 27, 1943

2,325,083

UNITED STATES PATENT OFFICE 2,325,083

STAND FOR MOTOR DRIVEN TOOLS AND THE LIKE

Herbert E. Tautz, Miami Beach, Fla., assignor, by mesne assignments, to Delta Manufacturing Company, Milwaukee, Wis., a partnership consisting of Marshall Field, Charles G. Cushing, and H. Campbell Stuckeman Application February 3, 1941, Serial No. 377,243

9 Claims. (Cl. 248—13)

The present invention relates to a stand or base suitable for supporting machinery.

More specifically, it relates to a stand for motor-driven woodworking tools such as jointers, although, of course, the invention is not limited to supporting any particular kind or kinds of machines, and may, for example, be used for circular saws, shapers, drill presses or other devices if desired.

An object of the invention is to provide a stand or cabinet having a pleasing appearance and ample strength, and which can be made with a minimum of machine work by assembling a number of separate panels preferably made as castings and forming the sides of the stand. By means of the construction contemplated, the edges of the panels are not necessarily in contact with one another along or near the corners or vertical joints of the stand, so that it is not necessary to provide accurately fitting edges along such corner joints and therefore it is not necessary to provide accurate edges along the panels, thereby eliminating machine work and the consequent expense.

Another feature of the stand is that two of the panels, which form the end members of the stand, have their vertical edge portions turned or directed inwardly so as to form the rounded vertical edges or corners of the stand, thus bringing the junctions with the side panels inwardly, which assists in concealing them and adds to the appearance as well as the strength of the stand. Preferably these end castings alone serve to support the machine tool and the motor for operating the same, the end castings being held to the side panels by a bracket assembly, while they additionally are prevented from spreading adjacent to the bottom by the motor-mounting plate, and may additionally be prevented from spreading near the top by a bar or other brace.

The panels are secured each to the adjacent one by means of slightly deformable corner braces or brackets and screws or bolts engaging the latter, whereby sufficient yield is available to permit drawing up the panels and braces to a snug fit, without requiring machine work or closely interfitting parts. Preferably slightly projecting lands are formed on the panels where the braces are to be placed, to further decrease the machining necessary.

Another feature of the stand resides in providing adjustable connections between the motor and the plate upon which it is mounted, whereby vertical adjustment of the motor is available. This makes it possible to adjust the tension of the belt or belts running from the motor-pulley to the pulley of the machine carried by the stand.

The construction lends itself well also to the provision of a shavings chute, which may likewise be supported by the end-castings. Another feature made possible by this construction is the provision of a belt guard formed integrally in one of the panels, thus saving considerable expense. This panel may also be made readily removable, by securing it to the brackets by means of knurled nuts or the like.

The invention will be understood more readily by reference to the accompanying drawings and the specification descriptive of the same, wherein is disclosed one embodiment of the invention, at present considered the preferred form.

In said drawings:

Fig. 5 is a fragmentary sectional view on the same plane as Fig. 4 but on an enlarged scale;

Fig. 6 is a fragmentary vertical section, on the plane indicated by the line 6—6 of Fig. 5;

Fig. 7 is an exploded view; and

Fig. 8 is a view showing a fragment of one of the end panels illustrating lands provided to receive the corner brackets.

In all the figures similar elements are indicated by corresponding reference characters.

Figure 1:
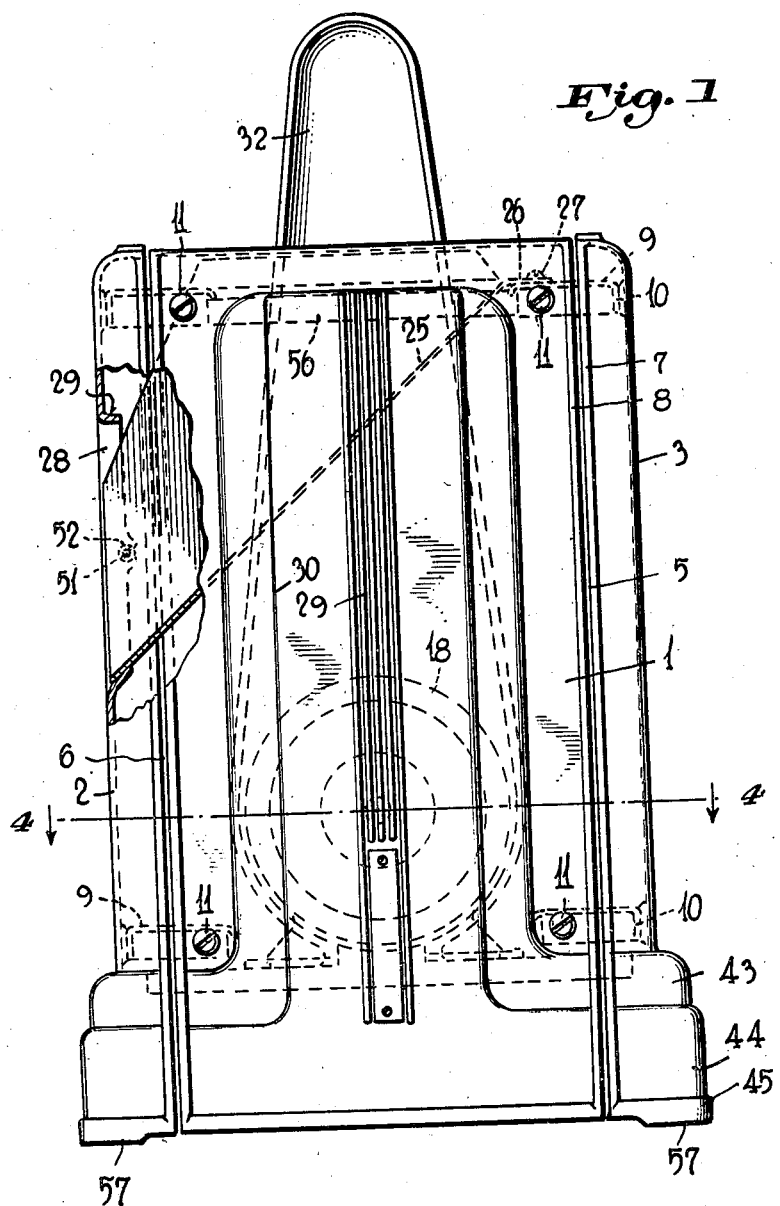
Fig. 1 is a front elevation of the casing or cabinet.
Figure 2:
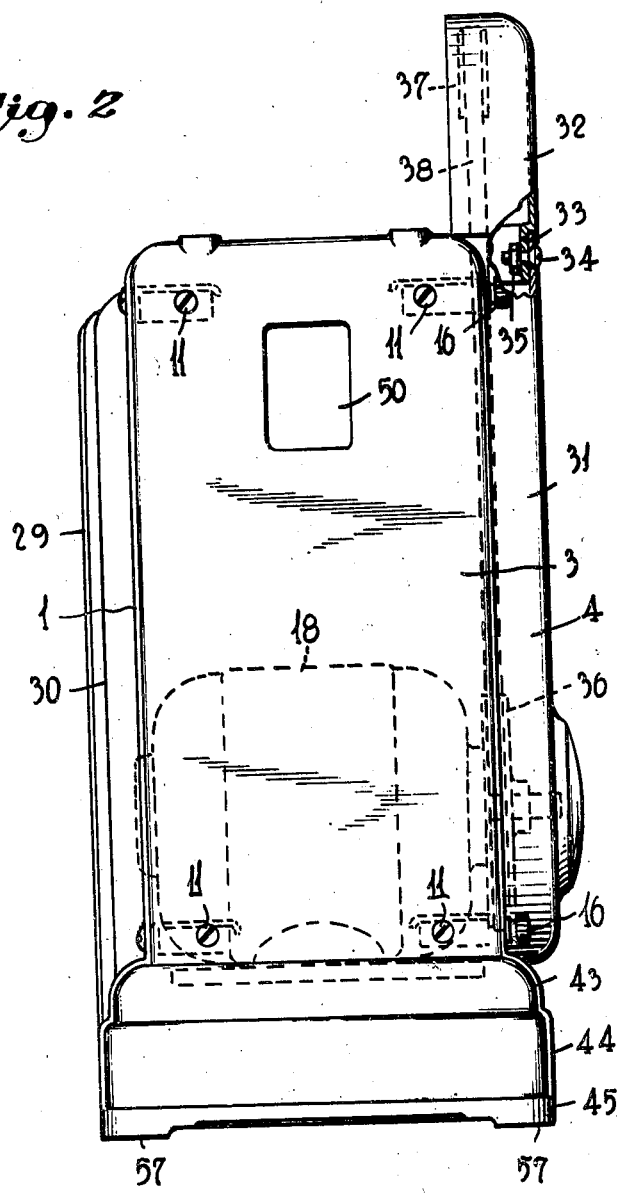
Fig. 2 is a side elevation thereof.
Figure 3:
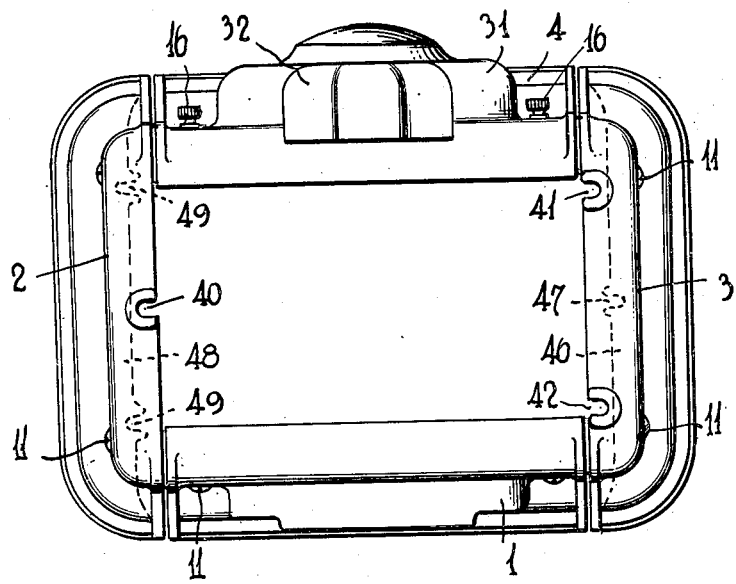
Fig. 3 is a plan view.

Referring first to Fig. 1, there is illustrated a stand or cabinet having a front panel 1, a left panel 2, and a right panel 3, the rear panel 4 being shown in Figs. 2 and 3. It will be noted that the various panels named preferably are not in edge-to-edge contact with one another, spaces such as 5 and 6 being left intentionally between the adjacent edges of the panels. In this way it becomes unnecessary to finish the said edges with any great approach to accuracy, that is, the castings may be used substantially in the mechanical condition in which they come from the foundry, aside from the customary cleaning and the removal of accidental fins or other defects incident to the casting operation.

It will be observed that flanges are provided on the edges of the panels as shown at 7 and 8 for example, thus strengthening the individual panels and giving them a more massive appearance, while at the same time minimizing any lack of alinement that may accidentally exist at the joints between the panels, as far as appearance goes.

Figure 4:
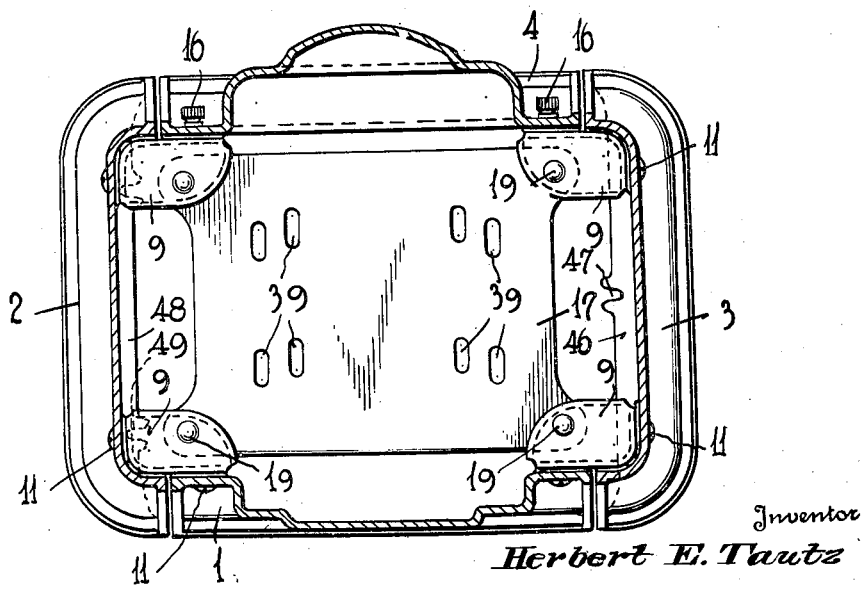
Fig. 4 is a horizontal section on the plane indicated by the line 4—4 of Fig. 1.

The various panels are held to their neighbors by means of corner braces or brackets 9, best shown in Figs. 4, 5, and 6. Each such brace consists of a substantially flat piece of metal, preferably sheet metal, having an upstanding flange 10 at two of its edges, said flange being bent substantially at right angles to the flat horizontal portion of the brace. These braces may also have curved flanges at their rounded edges, as shown at 53.

These braces are thin enough and soft enough to have a certain degree of yield, which will permit them to conform to the inner faces of the panels connected thereby, so that upon securing the braces in place by tightening the screws or bolts passing through alined holes in the flanges will engage closely against the lands 54 and 55 on the inner faces of the panels, thus producing a very strong and rigid joint which nevertheless has sufficient yield initially to permit correction for slight irregularities in the castings.

Eight such braces are illustrated in the present stand, four at the top and four at the bottom, as will be understood from Figs. 1 and 4. The securing means employed to fasten the braces to the panels are here shown as oval head screws 11, having nuts 12 engaged thereon, with lock washers 13 interposed, as shown clearly in Fig. 5.

A slightly different securing means is employed to hold the rear panel 4 to the flanges 10 of the cooperating braces. This consists of a screw 14 supported by the flange 10 in any preferred way, as by riveting or welding, if riveted having its head inside the said flange, the panel 4 having near each corner an opening 15 to receive the corresponding screw, which extends outwardly, a manually-operable knurled nut 16 being engaged on the threads of the screw. In this way the rear panel 4 may be removed and replaced readily without requiring the use of any tools, which adds to the convenience of the stand and provides ready access to the interior of the casing.

In addition to holding together the panels which form the casing, the lower braces 9 also serve to support a motor-mounting plate 17. This is shown in Figs. 4, 5, and 6, and serves to support the machine-operating motor 18, shown in dotted lines in Figs. 1 and 2. Means are provided for adjusting the plate 17 in a vertical direction. These comprise preferably four screws or bolts 19 mounted for example by riveting them into holes in the lower braces 9, or by welding if preferred, each screw having its head end engaged with the corresponding brace and its threaded portion 20 extending downwardly, and passing loosely through a corresponding hole 21 in a corner of the plate 17.

As stated, each screw 19 will preferably be mounted rigidly in its brace 9 so that it may not rotate nor be capable of moving vertically, although this is not essential but merely convenient. A knurled nut 22 is engaged on each screw 19 below the plate 17, and a machine nut 23 is engaged therewith above said plate, a lockwasher 24 being interposed between each nut and the adjacent surface of the plate 17. In this way the vertical position of the plate 17 may be adjusted by operating said nuts, and thereupon the plate may be securely maintained in its final adjusted position by tightening the nuts. The plate 17 then serves also to stiffen and strengthen the casing near its lower end, and prevents spreading when the rear panel 4 is removed.

The motor-receiving base 17 may be provided with openings of suitable sizes and shapes and proper location to cooperate with most available motors. As shown in Fig. 4 a number of slots 39 is provided. Obviously the ultimate purchaser of the cabinet may drill other holes in the plate 17 in case those initially provided do not accommodate the motor he plans to mount on the plate 17.

While the motor mounting plate 17 stiffens the casing near its lower end, in some cases it may be desired to stiffen the upper end of the casing also. For instance, when the removable panel 4 is taken off, there may be sufficient strain in the casing to cause the end panels 2 and 3 to spring together or apart to a small degree, thus making it difficult to replace the panel 4. This defect may be remedied, where it exists, by providing a bar or rod 56 extending across the rear of the casing as shown in Figs. 1 and 7, and secured to the end panels 2 and 3 in any preferred way. As shown, it is indicated as riveted or welded to two of the upper braces 9.

Another pair of the upper braces 9 likewise serves a double purpose, in that in addition to holding together the panels, they also serve to support the upper end of the shavings chute 25. This construction is shown at the upper right hand corner of Fig. 1, where it is seen that the chute 25 has a horizontal flange 26 at its upper end, resting on the right hand braces 9, and secured thereto in any desired way, for example, by screws 27 or the like passing through the flange 26 and threaded into the braces 9. The panel 2 has an opening 28 formed therein, with an inwardly extending flange 29, which receives the outer end of the shavings chute 25 and supports the same as best shown in Fig. 1. It will be understood of course, that this chute is open at both ends so that it may receive the shavings produced at the top of the stand and discharge them at the left hand side of Fig. 1.

The panel 1 herein referred to as the front panel, may be provided with any arbitrary ornamentation, as shown for example, at 29 and 30 if desired. Removal of the rear panel 4 gives access to the interior of the casing and it will be understood that the pulley of the motor is at the rear of the casing, when in the position shown in Fig. 1. It is also very convenient to place the motor so that its commutator end and inspection cover are at this same end, for ease of access.

A belt guard 31 may be formed integral with the rear panel 4, to accommodate the motor pulley and the belt or belts passing over the same. This belt guard 31 will preferably also be given an ornamental appearance, in keeping with the design of the entire cabinet, for example as illustrated in Fig. 3. An extension 32 will be provided to fit on the top of the belt guard 31, and may be secured by providing an inwardly offset lug or flange 33 on the extension 32, to fit within the belt guard 31, these parts then being secured together in any desired way, as by the screw 34 and nut 35. The motor pulley is indicated at 36 and the pulley of the jointer or other machine at 37, a single belt 38 here serving to connect the same, as shown in the dotted lines in Fig. 2. By thus forming the belt guard as an integral portion of one of the panels, considerable manufacturing expense is eliminated, and at the same time an inherently rigid double-flanged panel is provided.

At the upper end of each panel the same is preferably curved inwardly as shown in Fig. 3. This serves the triple purpose of stiffening the panel, providing a pleasing appearance, and reducing the size of the top of the casing to that corresponding to the base of the machine intended to be mounted thereon. In Fig. 3 the panel 2 is shown with a single notch 40 located approximately at the center of the inner edge of said curved flange, while two corresponding notches 41 and 42 are provided in the similar upper flange of the panel 3. These are spaced to correspond to the bolt holes in the machine to be carried by the casing. By providing curved notches instead of holes, it is possible to cheapen the manufacture, since such notches may be produced by casting and do not require any coring, drilling or the like. Obviously the locations of the notches will be varied to correspond to the machine with which the casing is to be used, and it will be understood that the arrangement shown in Fig. 3 is merely illustrative of one particular instance.

At the lower end of each panel there is an outwardly curved portion, which will produce a somewhat enlarged base when the panels are assembled to form the cabinet. These portions may have configurations consistent with the remainder of the casing, for example, as illustrated there may be an upper curved portion 43, with a lower portion 44 offset still further outward, and terminating at the bottom in a slight projection or flange 45, all as shown clearly in Figs. 1 and 2. It will be noted that these portions are continued correspondingly throughout all the panels, the panels 2 and 3 each having a substantially straight central portion, with quadrantal end portions, as indicated in Figs. 3 and 4 while the other two panels have substantially straight sections of these projections or "molding" at the bottom.

The panels 2 and 3 also provide means for securing the cabinet to a floor or foundation. These means consist of flanges cast in the lowermost portions of said panels, as shown at 46 in the panel 3, such flanges extending parallel to the floor and having suitable notches formed therein preferably by casting, as shown for example at 47, in the panel 3. The panel 2 preferably has a similar flange 48, with two notches 49, one near each end thereof, as shown in dotted lines in Fig. 3. These notches afford convenient means for receiving the bolts or other fastening means which hold the cabinet to its foundation. It will be noted that solely the end panels 2 and 3 preferably rest on the floor, due to the projections 57 thereon.

An opening 50 may be provided in one of the panels, for example the panel 3, to receive the switch for controlling the motor, while the panel 2 may have the somewhat larger opening 28 therein for receiving the outlet end of the shavings chute, as shown in Fig. 1. This chute may be secured to the flange 29 surrounding said opening by suitable fastenings 51, passing through a correspondingly located slot 52 in each side of the said flange. Obviously many kinds of fastenings 51 are suitable, for example tightly-securable bolts and nuts, or studs or other projecting lugs merely resting in the slots 52. If bolts and nuts are used, the chute 25 may be secured firmly to the panel 2, thus avoiding rattles or other noise, and adding to the rigidity of the entire cabinet besides. However, studs or the like will facilitate assembly and removal, while at the same time somewhat cheapening the manufacture. Such studs or lugs may be riveted or welded to the chute, or may be formed by drawing the material of the chute itself, in the well-known way, by a suitable press.

Fig. 8 shows how separate narrow lands 54 and 55 are provided by casting on the inner surfaces of the panels, to cooperate with the corner braces 9. These lands diminish the amount of metal in contact with the said braces and thus facilitate the finishing of the panels by requiring less metal to be removed by the grinding wheel to provide seats for the braces. The sharp edges of these lands also have a tendency to "dig" into the sheet metal of the braces to a certain extent, thus providing a more rigid joint therewith. It should be noted that in the end panels such as 2 and 3, which have curved vertical edge portions, these lands are formed only in the plane parts, that is, they terminate short of the curved corner, as shown in Fig. 8.

It will be understood that I have thus provided a substantial cabinet for the purpose of holding a motor-driven tool and accommodating also the motor and switch for the same. The casing is ornamental in appearance and is relatively cheap in manufacture, since the amount of machining has been reduced practically to a minimum.

This casing is particularly well adapted for mounting a jointer, although of course, it is not restricted to this particular motorized tool, but may be used also for other purposes if desired. The manner of assembling the cabinet has already been disclosed in detail hereinabove, but may be briefly summarized by stating that the four panels are connected to one another, near the top and bottom of each, by stamped sheet-metal braces and bolts, which permits a slight amount of yield so as to allow the various panels to be accommodated snugly to the securing braces, but yet gives a very rigid structure when completely assembled and tightened.

The motor-mounting plate further stiffens the cabinet near its lower portion, and is particularly helpful in preventing any spreading of the cabinet when the removable panel 4 is taken off, for otherwise there would be nothing to maintain the proper alinement of the remaining three panels except the sheet metal braces which might spring slightly when the removable panel is taken off, thus making it difficult to replace the latter. The angle-bar 56, when used, performs an additional stiffening function near the upper end of the cabinet.

The horizontal flanges in the end sections 2 and 3, near the bottom of each, stiffen the castings at such points and afford very rigid and convenient means for bolting the cabinet to its foundation, while the notches formed in the top flanges of such end sections serve to receive the bolts which secure the machine to the cabinet. The projections 57 keep the panels 1 and 4 out of contact with the foundation, and aside from facilitating the machining of the cabinet, make it possible to remove and replace the panel 4 without difficulty.

The fact that the removable panel 4 embodies the belt guard as an integral part thereof further simplifies and cheapens the manufacture, and also affords great convenience in operation, since it is necessary to remove only a single panel to give access to the belt or belts and the pulley end of the motor, as well as the commutator of said motor, which preferably is also located adjacent the pulley end.

While any suitable switch may be mounted in the opening 50, the present construction is especially convenient for use in connection with the switch boxes described in my co-pending application S. N. 254,375, which discloses a completely pre-wired assembly of motor, switch, wiring and attachment plug which may be applied readily to the present cabinet.

Having described a preferred embodiment of my invention, it should be understood clearly that various changes may be made therein by addition, omission, or modification of many of the component parts thereof, so that the invention is not to be considered to be limited to the specific disclosure, but is defined solely by the following claims.

I claim:

1. A stand for a machine tool, consisting of cast metal panels forming vertical sides, said panels being substantially out of contact with their neighbors at their vertical edges, slightly yieldable braces forming the sole connections between adjacent panels, said braces being secured to the panels in two series, one near the top and one near the bottom respectively of the cabinet, said stand being open at top and bottom, and a motor-support secured to the lower braces.

2. A stand for a machine tool, consisting of cast metal panels forming vertical sides, said panels being out of contact with their neighbors at their vertical edges, slightly yieldable braces forming the sole connections between adjacent panels, said braces being secured to the panels in two series, one near the top and one near the bottom respectively of the cabinet, said stand being open at top and bottom, a motor-support, and means for adjusting said support vertically, and securing it in adjusted position to the lower braces.

3. A stand for a machine tool, consisting of cast metal panels forming vertical sides, and having unmachined vertical edges, said panels being substantially out of contact with their neighbors at their vertical edges, slightly deformable braces forming the sole connections between adjacent panels, said braces being secured to the panels in two series, one series being near the top and the other being near the bottom respectively of the cabinet, said stand being open at top and bottom, and a motor-support secured to the lower braces and thereby stiffening the stand; one of the panels being secured to the braces by readily releasable means, to provide an easily removable door for the stand.

4. A cabinet consisting of cast metal panels forming vertical sides, said panels being substantially out of contact with their neighbors at their vertical edges, and slightly yieldable braces forming the sole connections between adjacent panels, said braces being secured to the panels in two series, one near the top and one near the bottom respectively of the cabinet, the panels having relatively narrow lands on their inner surfaces at the locations at which the braces bear against said surfaces.

5. A stand for a machine tool, consisting of cast metal panels forming vertical sides, said panels being substantially out of contact with their neighbors at their vertical edges, slightly yieldable braces forming the sole connections between adjacent panels, said braces being secured to the panels in two series, one near the top and one near the bottom respectively of the stand, a motor-support secured to the lower braces, and a cross piece connecting two opposite panels near one side of the top of the stand, to maintain them rigidly at the correct fixed distance from one another, the panel forming the side of the stand adjacent to said cross piece being removably secured to the corresponding braces.

6. A stand for a machine tool, consisting of cast metal panels forming vertical sides, said panels being substantially out of contact with their neighbors at their vertical edges, slightly deformable braces forming the sole connections between adjacent panels, said braces being secured to the panels in two series, one series being near the top and the other near the bottom respectively of the stand, and a cross piece connecting two opposite panels near one side of the top of the stand, to maintain them rigidly at the correct fixed distance from one another, the panel forming the side of the stand adjacent to said cross piece being removably secured to the corresponding braces.

7. In a stand for a machine tool, a pair of upright side panels; a pair of upright end panels, said panels being made of cast metal and each having a pair of edges terminating in unmachined faces each being so shaped as to substantially conform to its neighbor, said panels being disposed in side-by-side relationship with their neighboring faces located in close proximity but substantially out of contact, so as to provide a stand having closed sides and an open top and bottom; and means, independent of said panel edges, for securing said panels together in assembled relationship, and operable to firmly maintain them in assembled condition irrespective of the fit of the neighboring faces of said panels, comprising a series of brackets adjacent the top of the stand and a series of brackets adjacent the bottom of the stand, operable to secure said panels to each other inwardly of their edges, said brackets each comprising a member located inside the stand and bridging across the junction of one panel with its neighbor and embodying fastening means for securing spaced portions thereof in firm seating engagement with comparatively small areas of each panel, said members each possessing a sufficient degree of flexibility to permit it to undergo the requisite deformation necessary to firmly seat it against its panels under the action of said fastening means.

8. The stand defined in claim 7, wherein said brackets each embody a horizontal web portion, operable to preclude displacement of said panels in directions toward and away from each other in a horizontal plane, and vertical flange portions adapted to be deformed and secured in firm seating engagement with said panels.

9. In a stand for a machine tool, a pair of upright side panels; a pair of upright end panels, said panels being made of cast metal and each having a pair of parallel edges terminating in unmachined vertical faces, said end panels being of channel shape in horizontal section, and being disposed in spaced relationship with the vertical faces of one panel confronting the vertical faces of the other panel; and said side panels being disposed between the confronting faces of said end panels, with their neighboring faces located in close proximity but substantially out of contact, so as to provide a stand having closed sides and an open top and bottom; and means, independent of said vertical edges, for securing said panels together in assembled relationship, and operable to firmly maintain them in assembled condition irrespective of the fit of the neighboring vertical faces of said panels, comprising a series of brackets adjacent the top of the stand and a series of brackets adjacent the bottom of the stand, operable to secure said panels to each other inwardly of their vertical edges, said brackets each comprising a member located inside the stand and bridging across the junction of one panel with its neighbor and embodying fastening means for securing spaced portions thereof in full surface engagement with each panel, said members each possessing a sufficient degree of flexibility to permit it to undergo the requisite deformation necessary to firmly seat it against its panels under the action of said fastening means.

HERBERT E. TAUTZ.